United States Patent [19]

Zieren et al.

[11] Patent Number: 4,927,804
[45] Date of Patent: May 22, 1990

[54] THIN-FILM TRANSFORMER AND MAGNETIC HEAD PROVIDED WITH SUCH A TRANSFORMER

[75] Inventors: Victor Zieren; Jacobus J. M. Ruigrok, both of Eindhoven, Netherlands

[73] Assignee: U.S. Philips Corp., New York, N.Y.

[21] Appl. No.: 218,013

[22] Filed: Jul. 12, 1988

[30] Foreign Application Priority Data

Jul. 15, 1987 [NL] Netherlands ................... 8701667

[51] Int. Cl.⁵ .................... G11B 5/14; G11B 5/251
[52] U.S. Cl. ........................... 505/1; 360/126; 360/127; 360/120; 336/84 R
[58] Field of Search ............. 360/119, 120, 123, 124, 360/125, 126, 127, 128

[56] References Cited

U.S. PATENT DOCUMENTS

| | | | |
|---|---|---|---|
| 3,098,181 | 7/1963 | Cioffi | 335/216 |
| 3,214,679 | 10/1965 | Richards | 323/360 |
| 4,044,394 | 8/1977 | Hanazono et al. | 360/121 |
| 4,745,506 | 5/1988 | Nakamura et al. | 360/126 |
| 4,787,003 | 11/1988 | Nakamura et al. | 360/125 |

FOREIGN PATENT DOCUMENTS

| | | |
|---|---|---|
| 1522971 | 10/1969 | Fed. Rep. of Germany . |
| 58-68210 | 4/1983 | Japan . |
| 62-162213 | 7/1987 | Japan .................... 360/120 |
| 63-153707 | 6/1988 | Japan .................... 360/124 |
| 1052505 | 12/1966 | United Kingdom . |
| 1190454 | 5/1970 | United Kingdom . |
| 1335472 | 10/1973 | United Kingdom . |

OTHER PUBLICATIONS

Ellis, "Superconductors," Journal of Chemical Education, vol. 64, No. 10, Oct. 1987, pp. 836-841.

*Primary Examiner*—John H. Wolff
*Attorney, Agent, or Firm*—William L. Botjer

[57] ABSTRACT

Thin-film transformer suitable for use in a thin-film magnetic head has two magnetically permeable thin layers 3 and 5 primary turn constituted by an electrically conducting which form a magnetic yoke. A layer 13 and a secondary turn constituted by an electrically conducting layer 15 are located in the yoke. A layer 21 of a superconducting material is provided between the layer 3 and the turns, or the turns are closely fitted together and made of a superconducting material themselves.

2 Claims, 2 Drawing Sheets

THIN-FILM TRANSFORMER AND MAGNETIC HEAD PROVIDED WITH SUCH A TRANSFORMER

BACKGROUND OF THE INVENTION

The invention relates to a transformer comprising a magnetic yoke and at least a first electric turn and at least a second electric turn.

Such transformers are generally known and are frequently used to convert alternating voltage of given values into alternating voltages of different values. The known transformers comprise a magnetic yoke constituted by an iron core around which generally a plurality of first electric turns for forming a primary coil and a plurality of second electric turns for forming a secondary coil are provided. The known transformers have relatively large sizes, which makes them less suitable for use in sophisticated circuits in which usually small or very small electric, electronic or magnetic components are used.

SUMMARY OF THE INVENTION

It is an object of the invention to provide transformers having eminent properties, which have small dimensions and which are particularly suitable for use in or with modern circuits.

To this end a first transformer according to the invention is manufactured of a plurality of layers by a thin-film technique, a first magnetically permeable layer and a second magnetically permeable layer together constituting the magnetic yoke within which the turns formed from electrically conducting layers extend. A layer of a superconducting material is provided between the turns on the one hand and a part of the magnetic yoke on the other hand.

A superconducting material is herein understood to mean a material which is in a superconducting state and exhibits the full or substantially full Meissner effect. For practical reasons materials are preferred which have a relatively high critical temperature, for example above the temperature at which nitrogen liquefies at normal pressure. Suitable materials are, for example superconducting ceramic materials formed from compounds of lanthanum, barium, copper and oxygen such as $La_{1-x}Ba_xCuO_4$ with x between 0.15 and 0.6; lanthanum, strontium, copper and oxygen such as $La_{2-x}Sr_xCuO_4$ with x between 0.15 and 0.2; yttrium, barium, copper and oxygen, such as $YBa_2Cu_3O_{7-d}$ with d between 0.0 and 1.0 or $Y_{0.4}Ba_{0.6}Cu_{1.0}O_{3.0}$; or yttrium, barium, strontium, copper and oxygen, such as $YBa_{2-x}Sr_xCu_3O_8$ in which a part of the elements may be partly substituted, for example oxygen by fluorine or strontium by calcium.

The Meissner effect prevents magnetic short-circuit currents from occurring between the parts of the magnetically permeable layers located on either side of the layer of a superconducting material. In other words, the occurrence of magnetic stray flux between the first and the second magnetically permeable layer of the magnetic yoke is inhibited by the provided layer of a superconducting material. Consequently large potential losses can be prevented and the total losses of the loaded transformer can mainly be limited to losses due to the magnetical resistance of the material of the magnetic yoke and the electrical resistance of the material of the turns. Therefore a transformer having a high efficiency can be obtained by means of the measures according to the invention. Due to its structure the transformer has of course the advantage that it has small dimensions.

A favorable embodiment of the transformer which may have a still higher efficiency is characterized in that the electrically conducting layers constituting the first and second turns comprise a superconducting material. In this embodiment the phenomenon is utilized that the electrical resistance of a material in a superconducting state is zero or substantially zero. Consequently a considerable reduction of the electrical or ohmic resistance of the turns can be achieved with this embodiment, which results in a considerable reduction of the development of heat. A second transformer according to the invention is manufactured of a plurality of layers by a thin-film technique, a first magnetically permeable layer and a second magnetically permeable layer together constituting the magnetic yoke within which the turns formed from electrically conducting layers of a superconducting material extend. At least within the magnetic yoke the distance between the juxtaposed turns of a superconducting material is small with respect to the width of the turns.

This transformer has the advantage that the superconducting turns have no or only a very small electrical resistance, so that potential losses in the turns do not occur or hardly occur when the transformer is loaded. Furthermore this transformer has the advantage that the turns located at a very small distance from one another within the magnetic yoke constitute a superconducting shield, as it were, which inhibits magnetic stray flux between the first and the second magnetically permeable layer of the magnetic yoke. Large potential losses can be prevented thereby and the total losses of this loaded transformer can mainly be limited to losses due to the magnetical resistance of the material of the magnetic yoke. Preferably, a distance between the turns will be taken which is smaller than half the width of the separate turns. Also this transformer, likewise as the previously described transformer according to the invention, has of course the advantage of small dimensions.

Transformers are also used with magnetic heads having one or more inductive transducing elements for transforming alternating voltages associated with magnetic information. Due to their favorable properties the transformers according to the invention are eminently suitable for use in combination with such a magnetic head. If in addition the magnetic head is of the thin-film type, the invention provides the surprising possibility of forming the transformers and the magnetic head as one unit. Consequently, the invention also relates to a thin-film magnetic head having at least an inductive transducing element and a face for magnetic flux coupling of the transducing element with a magnetic recording medium. A first magnetically permeable layer and a second magnetically permeable layer together constitute a magnetic yoke having a transducing gap present on the face, the layers extending on either side of the transducing element.

Such a magnetic head is described in U.S. Pat. Ser. No. 4,239,587, herein incorporated by reference, and may be used in apparatus for recording and/or reading information on a magnetic layer. Such apparatus may be intended for industrial uses, for example information storage apparatus using magnetic disks, drums or tapes, or for consumer uses, for example video recorders. The known magnetic head has two NiFe layers provided on a substrate, which layers together constitute a magnetic yoke. A front portion of the magnetic yoke, which is intended for flux coupling with a recording medium, has a transducing gap. A rear portion of the yoke constitutes the joint between the two layers. A flat turn of electrically conducting material insulated from the magnetic yoke and constituting the inductive transducing element is provided around the joint.

It is also an object of the invention to provide a magnetic head of the type described with an integrated transformer. In addition to a first electrically conducting layer constituting the transducing element, a second electrically conducting layer is provided, which together with the first electrically conducting layer and the magnetic yoke constitutes one of the above-described transformers.

The magnetic head may be manufactured in the form of a multilayer thin-film structure, possibly provided on a substrate. Sputtering techniques, photo-etching techniques, electrodeposition processes and vapor deposition techniques may be used to realize the multilayer structure. The invention has the advantage that a thin-film magnetic head in which a high efficiency transformer is present can be obtained by only slightly adapting the manufacturing process of the known magnetic head. The use of a separate transformer is therefore superfluous in that case.

A layer of a superconducting material may extend in the transducing gap as far as the face for magnetic flux coupling of the transducing element with a magnetic recording medium. Due to its magnetic shielding the layer of a superconducting material in the gap prevents stray flux from occurring between the first and second magnetically permeable layers at the area of the gap. The result is a very high efficiency of the magnetic head.

DETAILED DESCRIPTION OF THE PREFERRED EMBODIMENT

Figure 1:
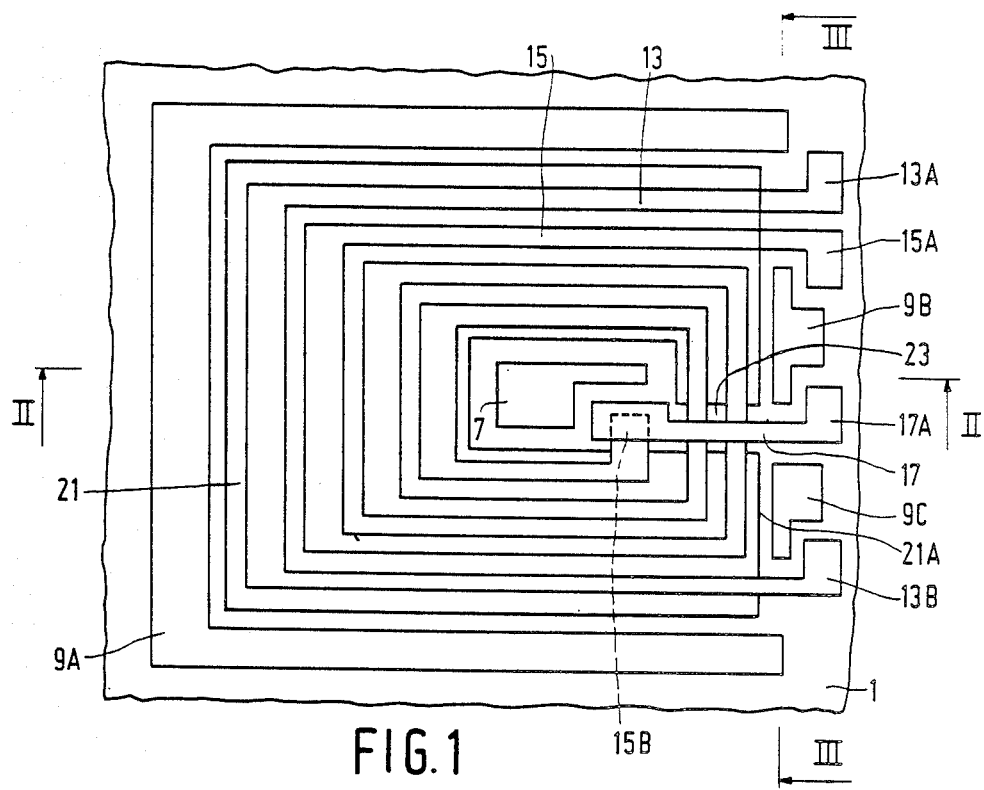
FIG. 1 is a diagrammatic plan view of an embodiment of a transformer according to the invention.
Figure 2:
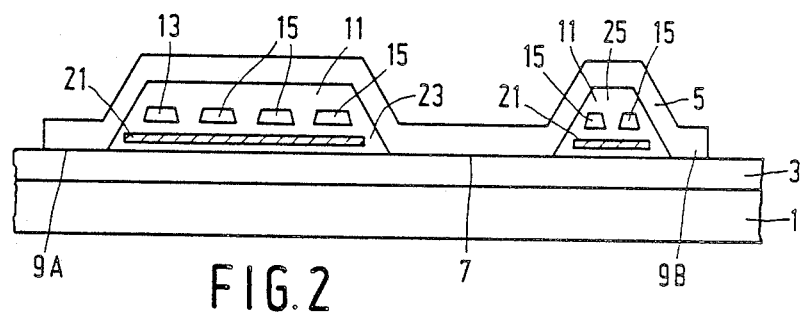
FIG. 2 is a diagrammatic cross-section taken on the arrows II—II in FIG. 1.
Figure 3:
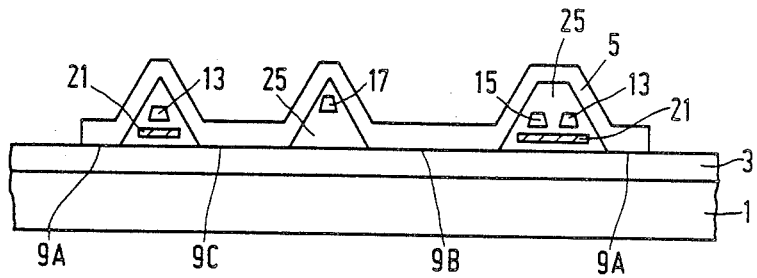
FIG. 3 is a diagrammatic cross-section taken on the arrows III—III in FIG. 1.

The transformer shown in FIGS. 1, 2 and 3 forms one assembly with a substrate 1 of a non-electrically conducting material such as glass and may be manufactured as a multilayer thin-film structure provided on the substrate 1. Techniques and processes such as sputtering or vapor deposition known from the thin-film technique may be used to realize the multilayer structure. The multilayer structure comprises a first layer 3 of a magnetically permeable material such as a nickel-iron alloy or an iron-silicon-aluminium alloy and a second layer 5 of a similar material. The first magnetically permeable layer 3 is deposited on the substrate 1, while the second magnetically permeable layer 5 is provided in such a way that the two layers 3 and 5 are magnetically connected together in the regions denoted by 7 and 9A, 9B, 9C and are magnetically insulated from each other outside these regions. In this way the layers 3 and 5 combined constitute a magnetic yoke with an internal space 11. Two thin electrically conducting layers 13 and 15 of, for example copper or gold, but preferably of a superconducting material such as $YBa_2Cu_3O_{7-d}$ are provided around the region 7. The layer 13 constitutes approximately one turn which can be considered as the primary coil of the transformer, while the layer 15 which has a more or less helical form, constitutes approximately three turns which together can be considered as the secondary coil of the transformer. The layer 13 has two connection faces 13A and 13B to which external electric conductors (not shown) can be connected. The layer 15 has only one connection face 15A, but at the area of a face 15B it makes electrical contact with a thin extra layer 17 of an electrically conducting material which has a connection face 17A. The layer 15 can therefore be connected to further connection conductors (not shown) by means of the connection faces 15A and 17A.

A layer 21 of a superconducting material, for example one of the previously mentioned ceramic materials, extends between the electrically conducting layers 13 and 15 on the one hand and the magnetically permeable layer 3 on the other hand. To inhibit the occurrence of unwanted circuit currents in the layer 21, the layer 21 has an interruption 23 which extends from the region 7 which is more or less centrally located with respect to the layer 21 up to an edge 21A of the layer 21. Viewed in the turn direction of the secondary coil, the interruption 23 may be narrow.

Insulation layers are provided in known manner between the successive layers 3, 21, 13, 15 and 5. All the insulation layers, which may be quartz and/or a photoresist, are denoted by the reference numeral 25. For the sake of completeness it is to be noted that for clarity purposes of FIG. 1 the layers 5 and 25 are assumed to be transparent.

Figure 4:
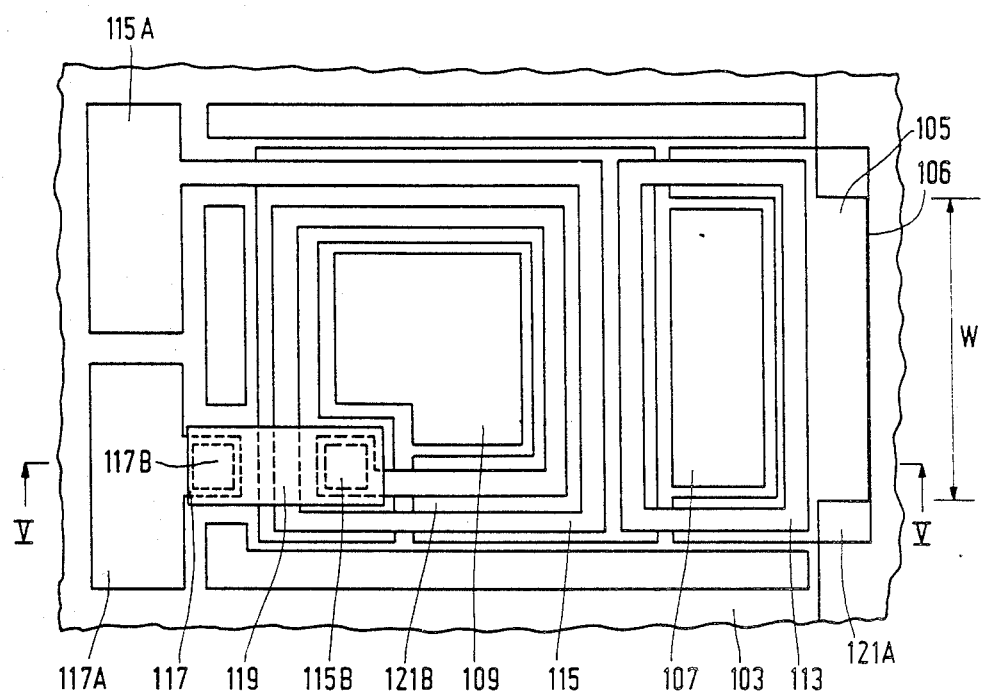
FIG. 4 is a diagrammatic plan view of a first embodiment of the magnetic head according to the invention.
Figure 5:
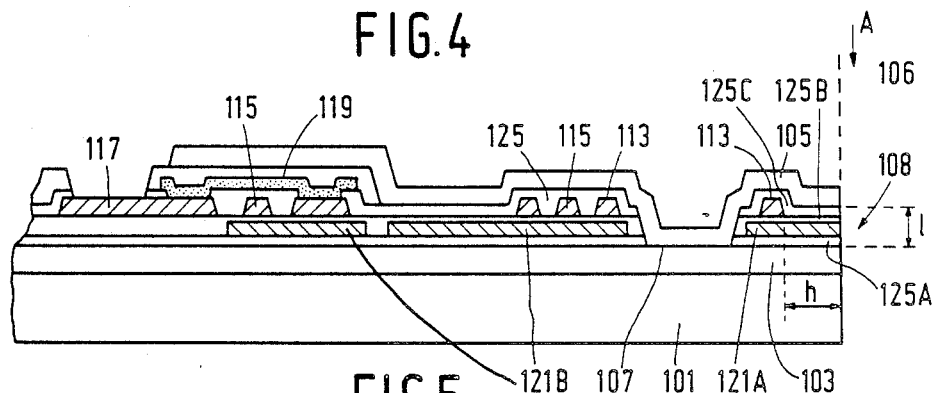
FIG. 5 is a diagrammatic cross-section taken on the arrows V—V in FIG. 4

The thin-film magnetic head shown in FIGS. 4 and 5 may be manufactured by sputtering and/or vapor deposition. The magnetic head shown is composed of a plurality of thin layers provided one after the other, of which a first layer 103 of a magnetically permeable material such as an NiFe alloy (permalloy), an FeAlSi alloy (sendust) or an amorphous alloy is deposited on a wear-resistant, nonelectrically conducting substrate 101 of, for example, glass or aluminium oxide. Together with a second magnetically permeable layer 105, the first layer 103 constitutes a magnetic yoke having a transducing gap 108 bounding a face 106 and having a gap length l, a gap width w and a relatively large gap height h, and regions 107 and 109 where the layers 103 and 105 are magnetically connected together. A layer 113 of an electrically conducting material for constituting a turn is provided around the region 107. The turn extends between spatially separated parts of the layers 105 and 107 and constitutes the inductive transducing element of the magnetic head. A helically extending layer 115 of electrically conducting material is provided around the region 109 for constituting a coil which together with the turn constituted by the layer 113 and the yoke constituted by the layers 103 and 105 constitutes a thin-film transformer in which the layer 115 can be considered as a primary coil and the layer 113 as a secondary coil when the magnetic head is used as a write head. The layer 115 has a connection face 115A for connection to a first external electric conductor and a through-connection face 115B. The magnetic head has also a connection face 117A for connection to a second external electric conductor. The connection face 117A is provided on an extra layer 117 of an electrically conducting material on which layer 117 a through-connection face 117B is provided. An electrically conducting layer 119 bridges the distance between the two through-connection faces 115B and 117B and thereby establishes the electrical connection between the layer 115 and the connection face 117A. Suitable electrically conducting materials for the electrically conducting layers are, for example metals such as gold or copper.

In this embodiment the transducing gap 108 is formed by two insulation layers 125A and 125B of an electrically insulating material such as $SiO_2$ and a layer 121A of a superconducting material extending therebetween, and a third insulation layer 125C. The superconducting layer 121A extends from the face 106, in which the magnetic flux coupling takes place between the transducing element and a magnetic recording medium which is moved along the transducing gap in the direction of the arrow A, as far as the region 107. A layer 121B, likewise of a superconducting material extends from the region 107 to beyond the region 109. The total superconducting layer is therefore located between the electrically conducting layers 113 and 115 and the magnetically permeable parts of the layer 105 spatially separated from the layer 103 on the one hand and the magnetically permeable layer 103 on the other hand. One of the above-mentioned materials may be used as a superconducting material. As is shown in FIG. 4, the layers 121A and 121B have such a structure that no unwanted circuit currents can be produced. The insulation layers 125A, 125B and 125C extend from the face 106 and fill the space between the layers 103 and 121A, 121B and the layers 121A, 121B and 105, respectively. A plurality of thin insulation layers are of course locally present between the layers 103 and 105. All these insulation layers are denoted by the reference numeral 125 in FIG. 5. For the sake of completeness it is to be noted that for the purpose of clearly showing the magnetic head in FIG. 4 the layers 105 and 125, 125A, B, C are assumed to be transparent.

It is to be noted that the provided superconducting layer 121A may have a large gap height h and a small gap length l without causing efficiency problems. For achieving a long lifetime of thin-film magnetic heads a large gap height h is very desirable, while a small gap length l is desirable for improving the resolution of the magnetic head. Furthermore it is to be noted that instead of one yoke a plurality of magnetic yokes constituted by magnetically permeable layers 103 and 105 may of course be provided on the substrate 101 for forming a multi-gap thin-film magnetic head according to the invention, which is suitable for cooperation with multitrack magnetic recording media.

Figure 6:
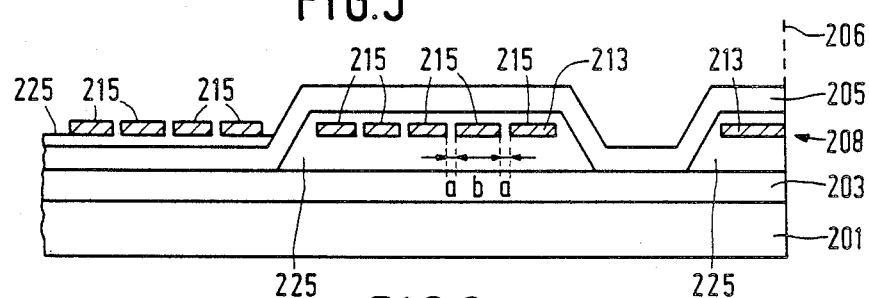
FIG. 6 is a diagrammatic cross-section of a second embodiment of the magnetic head according to the invention.

The thin-film magnetic head shown in FIG. 6 comprises a substrate 201 of a wear-resistant material, a first layer 203 and a second layer 205 each of a magnetically permeable material, an inductive transducing element and a transformer. The transducing element is formed by a layer 213 provided in the form of a turn and the transformer is formed by the layer 213 in combination with a layer 215 provided in the form of a winding. The layers 213 and 215 are formed from a superconducting material, for example one of the previously mentioned superconducting materials and together they constitute a magnetic yoke. This magnetic head can be used, for example as a read head in which case the layer 213 can be considered as the primary coil and the layer 215 can be considered as the secondary coil of the transformer. The distance between the juxtaposed turns formed by the layers 213 and 215 is much smaller than the width of the separate turns. Furthermore the magnetic head has a transducing gap 208 adjacent a face 206 for magnetically coupling the transducing element with a magnetic recording medium, in which gap a part of the turn formed by the layer 213 is present Insulation layers are of course provided between the layers 203 and 213, 215 and the layers 213, 215 and 205, respectively. All these layers are denoted by the reference numeral 225.

The structure of the magnetic head of FIG. 6 is slightly simpler than that of the magnetic heads shown in FIGS. 4 and 5, but it has the same favorable properties. This magnetic head can also be formed as a multi-gap magnetic head.

What is claimed is:

1. A thin-film magnetic head comprising a first electrically conducting layer which constitutes an inductive transducing element, a face for magnetic flux coupling of the transducing element with a magnetic recording medium, a first magnetically permeable layer and a second magnetically permeable layer which together constitute a magnetic yoke having a transducing gap present on the face, the magnetically permeable layers extending on either side of the transducing element, characterized in that the magnetic head also has a second electrically conducting layer which together with the first electrically conducting layer and the magnetic yoke constitutes a transformer, said transformer further comprising a layer of superconducting material between the electrically conducting layers and one of the magnetically permeable layers which constitute the magnetic yoke.

2. A thin-film magnetic head as claimed in claim 1, characterized in that a layer of a superconducting material extends in the transducing gap as far as the face for magnetic flux coupling of the transducing element with a magnetic recording medium.

* * * * *

UNITED STATES PATENT AND TRADEMARK OFFICE
CERTIFICATE OF CORRECTION

PATENT NO. : 4,927,304

DATED : May 22, 1990

INVENTOR(S) : Zieren et al

It is certified that error appears in the above-identified patent and that said Letters Patent is hereby corrected as shown below:

Column 6, line 24, insert .(period) after "present".

Signed and Sealed this

Fourteenth Day of January, 1992

Attest:

HARRY F. MANBECK, JR.

Attesting Officer

Commissioner of Patents and Trademarks